(12) United States Patent
Bartier et al.

(10) Patent No.: US 10,833,910 B1
(45) Date of Patent: Nov. 10, 2020

(54) OPPORTUNISTIC USE OF DIFFERENT MODULATION SCHEMES

(71) Applicant: Itron Global SARL, Liberty Lake, WA (US)

(72) Inventors: Jerome Bartier, Edinburgh (GB); Fabrice Monier, Bry sur Marne (FR); Yacine Khaled, Meudon (FR); Ahmad Kaouk, Meudon (FR); Vincent Roussel, Meudon (FR); Bastien Mainaud, Ris-Orangis (FR); Viet-Hung Nguyen, Saint-Mande (FR)

(73) Assignee: Itron Global SARL, Liberty Lake, WA (US)

( * ) Notice: Subject to any disclaimer, the term of this patent is extended or adjusted under 35 U.S.C. 154(b) by 0 days.

(21) Appl. No.: 16/599,956

(22) Filed: Oct. 11, 2019

(51) Int. Cl.
*H04W 84/18* (2009.01)
*H04L 27/32* (2006.01)
*H04L 12/44* (2006.01)

(52) U.S. Cl.
CPC .............. *H04L 27/32* (2013.01); *H04L 12/44* (2013.01); *H04W 84/18* (2013.01)

(58) Field of Classification Search
CPC ..... H04B 15/00; H04B 1/0483; H04W 52/06; H04W 52/026; H04L 12/44; H04L 27/32; H04L 1/0003; H04L 1/0008; H04L 1/0009
See application file for complete search history.

(56) References Cited

U.S. PATENT DOCUMENTS

| 10,305,669 | B2 * | 5/2019 | Nguyen | H04L 5/1453 |
| 2013/0343255 | A1 * | 12/2013 | Han | H04L 1/0009 370/312 |
| 2019/0181975 | A1 * | 6/2019 | Kalhan | H03M 13/25 |
| 2019/0260497 | A1 * | 8/2019 | Wang | H04L 1/0008 |
| 2020/0022204 | A1 * | 1/2020 | Husted | H04L 1/0003 |

* cited by examiner

*Primary Examiner* — Thanh C Le
(74) *Attorney, Agent, or Firm* — Lee & Hayes, P.C.

(57) ABSTRACT

Techniques are directed to opportunistically communicating using a modulation scheme that is other than the preferred modulation scheme, to update communication metric data for the second modulation scheme, such as a modulation scheme that has not been used as much as the first modulation scheme. The second modulation scheme may be associated with a higher data rate than the preferred modulation scheme. If communication using the second modulation scheme is successful, subsequent communication may be carried out exclusively using the second modulation scheme, and the communication metrics may develop such that the second modulation scheme becomes the preferred modulation scheme.

20 Claims, 5 Drawing Sheets

OPPORTUNISTIC USE OF DIFFERENT MODULATION SCHEMES

BACKGROUND

Communication networks, such as wireless mesh networks, star networks, and so on, are used to connect a variety of different devices. These communication networks often contain devices having different characteristics and capabilities. As such, in many instances, the devices are able to communicate according to multiple modulation schemes. A device may select a modulation scheme for communication based on metrics associated with modulation schemes that are available. The metrics may indicate a success of previous communications for those modulation schemes. However, when a particular modulation scheme is determined to be preferred, other modulation schemes may not be evaluated very well or at all.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items.

DETAILED DESCRIPTION

Figure 1:
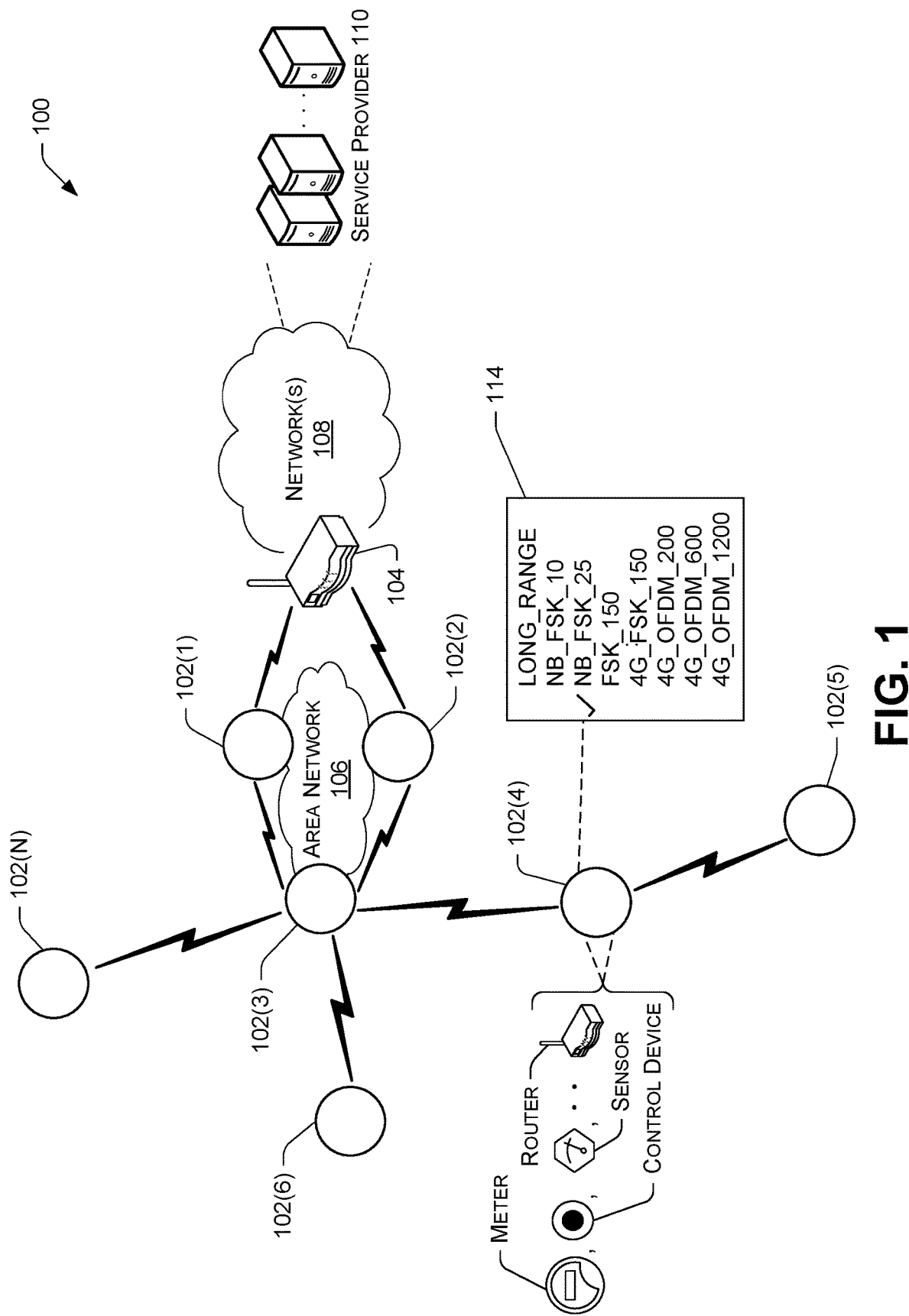
FIG. 1 is a schematic diagram of an example network architecture.

As discussed above, metrics about different modulation schemes may be evaluated to select an appropriate modulation scheme for a communication. However, in many instances relatively little information may be available about a modulation scheme, since the modulation scheme may not have been used frequently. This may lead to an incorrect evaluation of the modulation scheme.

This disclosure describes techniques directed to exercising one or more different modulation schemes, even those that have not been determined to be preferred based on metrics associated with communication using the modulation schemes. Furthermore, communication using the one or more non-preferred modulation schemes may even perform better than communication using the preferred modulation scheme. In one example, non-preferred modulation schemes are used opportunistically and, in some illustrations, communication using a non-preferred modulation scheme is continued so long as it is successful, in spite of it not being the determined preferred modulation scheme. Using a non-preferred modulation scheme may not only provide a chance to test whether communication using the one or more non-preferred modulation schemes can be carried out successfully. but it may also allow for development of metrics associated with one or more non-preferred modulation schemes. As such, the techniques may generate communication metric data for a modulation scheme that may not otherwise be used frequently This may ultimately lead to a more robust determination of which modulation scheme is determined to be preferred.

In one illustration, a device may communicate with another device according to a first modulation scheme that has been determined based on metrics to be a preferred modulation scheme. The two devices may communicate over a link (e.g., a direct communication path between the devices). The device may store information regarding a number of transmission attempts to the other device, a number of transmissions acknowledged by the other device, and so on. Such information may generally represent communication metric data regarding successful and/or unsuccessful transmissions on the link between the two devices. The device may opportunistically communicate using a second modulation scheme that is other than the preferred modulation scheme, to update communication metric data for the second modulation scheme, such as a modulation scheme that has not been used as much as the first modulation scheme. The second modulation scheme may be associated with a higher data rate than the preferred modulation scheme (and may thus, for example, offer higher throughput than if the preferred modulation scheme is used). If communication using the second modulation scheme is successful, subsequent communication may be carried out exclusively using the second modulation scheme, and the communication metrics may develop such that the second modulation scheme becomes the preferred modulation scheme.

In some illustrations, communication using the second modulation scheme may be performed on a random basis, such as with a probability based at least in part on a link margin for the modulation scheme. In some illustrations, communication using the second modulation scheme may not be performed at all while the link margin for the second modulation scheme does not exceed a minimum link budget for the second modulation scheme. In some examples, opportunistic-communication using the second modulation scheme may be discontinued if and when an indication of the preferred modulation scheme is updated.

In some examples, the techniques may be implemented in the context of an advanced metering infrastructure (AMI) of a utility communication network. However, the techniques described herein are not limited to use in a utility industry AMI. For example, the techniques may be implemented in the context of Distribution Automation, Home Energy Management or any other type of wireless or wired network. Unless specifically described to the contrary, the techniques described herein applicable to any communications network, control network, and/or another type of network or system. In one example, the techniques may be implemented in the context of the Internet of Things (IoT).

Example Environment

FIG. 1 is a diagram illustrating an example networked environment or architecture 100. The architecture 100 includes multiple network communication devices 102(1)-102(N) (collectively referred to as "network communication devices 102") and a network communication device 104, where N is any integer greater than or equal to 1. The network communication devices 102 and the network communication device 104 may be in communication with one another via an area network (AN) 106. In the example of FIG. 1, the network communication device 104 is implemented as an edge device, which serves as a connection point of the AN 106 to one or more networks 108 (e.g., a backhaul network), such as the Internet. The network communication device 104 may include, but is not limited to, a field area router (FAR), a cellular relay, a cellular router, an edge router, a DODAG (Destination Oriented Directed Acyclic Graph) root, a root device or node of the AN 106, a combination of the foregoing, or the like. In this example, the network communication device 104 relays communications from the AN 106 to a service provider 110 via the one or more networks 108. Any of the network communication devices 102, the network communication device 104, and/or the service provider 110 may perform processing to attribute information regarding communications with a first modulation scheme to a second modulation scheme.

As used herein, the term "area network" (AN) refers to a defined group of devices that are in communication with one another via one or more wired or wireless links. Examples of area networks include, for example, local area networks (LANs), neighborhood area networks (NANs), personal area networks (PANs), home area networks (HANs), field area networks (FANs), or the like. While only one AN 106 is shown in FIG. 1, in practice, multiple ANs may exist and may collectively define a larger network, such as an advanced metering infrastructure (AMI) of a utility communication network. At any given time, each individual device may be a member of a particular AN. Over time, however, devices may migrate from one AN to another geographically proximate or overlapping AN based on a variety of factors, such as respective loads on the ANs, battery reserves, interference, or the like.

The term "link" refers to a direct communication path between two devices (without passing through or being relayed by another device). A link may be over a wired or wireless communication path. Each link may represent a plurality of channels over which a device is able to transmit or receive data. Each of the plurality of channels may be defined by a frequency range which is the same or different for each of the plurality of channels. In some instances, the plurality of channels comprises Radio Frequency (RF) channels. The AN 106 may implement a channel hopping sequence, such that a channel may change over time. Although many examples discussed herein implement a plurality of channels as data channels, in some instances the plurality of channels include a control channel that is designated for communicating messages to specify a data channel to be utilized to transfer data. Transmissions on the control channel may be shorter relative to transmissions on the data channels.

The AN 106 may comprise a mesh network, in which the network communication devices relay data through the AN 106. Alternatively, or additionally, the AN 106 may comprise a star network, in which a central device acts a parent to one or more children devices. Further, in some instances the AN 106 may include a portion that is implemented as a mesh network and a portion that is implemented as a star network. Moreover, in other instances the AN 106 may be implemented in whole or part by other types of networks, such as hub-and-spoke networks, mobile networks, cellular networks, etc. In some instances, a device may be able to communicate with multiple different types of networks (e.g., a mesh network and a star network) at the same or different times. For instance, if a device is unable to discover a suitable device in a mesh network mode, the device may attempt to connect to a nearby star network, mobile data collection network, or cellular network. Regardless of the topology of the AN 106, individual network communication devices may communicate by wireless (e.g., radio frequency) and/or wired (e.g., power line communication, Ethernet, serial, etc.) connections.

In some instances, the service provider 110 comprises one or more central office systems that include a security service such as Authentication, Authorization and Accounting (AAA) server, a network registration service such as Dynamic Host Configuration Protocol (DHCP) server, a network management service (NMS), a collection engine (CE), a meter data management system (in the utility context), a customer relationship management system (in the sales context), a diagnostic system (in a manufacturing context), an inventory system (in a warehouse context), a patient record system (in the healthcare context), a billing system, etc. Network communication devices may register or interact with some or all of these one or more central office systems. In one example, the one or more central office systems may implement a meter data management system to collect resource consumption data from the network communication devices of the AN 106, process the resource consumption data, provide data regarding resource consumption to customers, utilities, and others, and/or perform a variety of other functionality. In other instances, the service provider 110 comprises other systems to implement other functionality, such as web services, cloud services, and so on. In yet other instances, the service provider 110 may be implemented as other types of devices, such as in the context of the Internet of Things (IoT) that allows a variety of devices to exchange data.

The service provider 110 may be physically located in a single central location, or it may be distributed at multiple different locations. The service provider 110 may be hosted privately by an entity administering all or part of the communications network (e.g., a utility company, a governmental body, distributor, a retailer, manufacturer, etc.), or may be hosted in a cloud environment, or a combination of privately hosted and cloud hosted services.

As noted above, any of the network communication devices 102, the network communication device 104, and/or the service provider 110 may communicate according to various modulation schemes and perform processing to determine and indicate a preferred modulation scheme. In the FIG. 1 illustration, NB_FSK_25 is indicated by a check mark in the data structure 114 as being a preferred modulation scheme. As also noted above, even though one modulation scheme is indicated as being preferred, a network communication device 102 is configured to opportunistically communicate using at least one other, non-preferred, modulation scheme.

For instance, the network communication device 102(4) may transmit and/or receive one or more communications/transmissions (e.g., Protocol Data Units (PDUs), such as bits, frames, packets, segments, etc.) with the network communication device 102(5) using the indicated preferred modulation scheme, and opportunistically communicate using at least one second, non-preferred, modulation scheme. If a transmission using the second modulation scheme is successful (e.g., it is acknowledged by the network communication device 102(5)), the network communication device 102(4) may update, at 114, communication metric data for the second, non-preferred, modulation scheme, to indicate a successful transmission. Further, if a transmission using a non-preferred modulation scheme is unsuccessful (e.g., it is not acknowledged by the network communication device 102(5)), the network communication device 102(4) may update, at 114, communication metric data for the non-preferred modulation scheme to indicate an unsuccessful transmission. Any number of non-preferred modulation schemes may be used and communication metrics updated.

Communication metric data may include a detected/measured value, a computed value, or any other statistic, metric, or value related to communication. For example, communication metric data may indicate a number of transmission attempts (e.g., a number of transmissions sent), a number of successful transmissions (e.g., a number of transmissions that are acknowledged by a receiving node), a number of unsuccessful transmissions (e.g., calculated by subtracting a number of transmission attempts by a number of acknowledgements), and so on. Further, in some examples communication metric data includes an Expected Transmission (ETX) metric and/or an Expected Transmission Time (ETT) metric, as discussed in further detail below.

In many instances, communication metric data may include data that is specific to a particular modulation scheme and/or to a particular link (e.g., direct communication path between devices). To illustrate, communication metric data may indicate a number of successful transmissions and a number of transmission attempts via a particular link (between a first node and a second node) with a particular modulation scheme.

An ETX metric may generally indicate an expected number of transmissions required to successfully send a transmission to a device. The ETX metric may be computed in a variety of manners. In one example, an ETX metric equals a total number of transmissions sent (e.g., transmission attempts) over a number of successful transmissions (e.g., transmissions acknowledged). In another example, an ETX metric equals 1/P, where P=Pf×Pr. Here, Pf corresponds to a probably that a transmission successfully arrives at a recipient, and Pr corresponds to a probability that an acknowledgment transmission is successfully received by a sender. Pf and Pr may be calculated according to the following formulas:

$$Pf = \frac{\text{Number of transmissions (e.g., probes) received by a neighbor (e.g., recipient)}}{\text{Number of transmissions (e.g., probes) sent by a sender}}$$

$$Pr = \frac{\text{Number of transmissions (e.g., probes) received by a sender}}{\text{Number of transmissions (e.g., probes) sent by a neighbor (e.g., recipient)}}$$

In some instances, such as where Pf and Pr cannot be computed separately (e.g., when the sender does not know the number of transmissions that a receiver sent to it), then the ETX metric may be estimated as in the first example above. That is, if Pf and Pr cannot be computing separately due to a lack of information, the ETX metric may correspond to a total number of transmissions sent over a number of successful transmissions.

An ETT metric may generally indicate an expected time required to successfully send a transmission to a device. In one example, the ETT metric equals a time to transmit a transmission of a given size multiplied to the ETX metric.

Communication metric data may be used in a variety of manners. In some instances, communication metric data is used to select a modulation scheme for communicating. For example, a network communication device may select a modulation scheme to use for communicating on a particular link based on ETX metrics for multiple modulation schemes that are available for the link. In particular, if a first modulation scheme that is supported by two network communication devices is associated with a lower ETX metric than a second modulation scheme that is also supported by the two network communication devices, the first modulation scheme may be selected.

Example Network Communication Device

Figure 2:
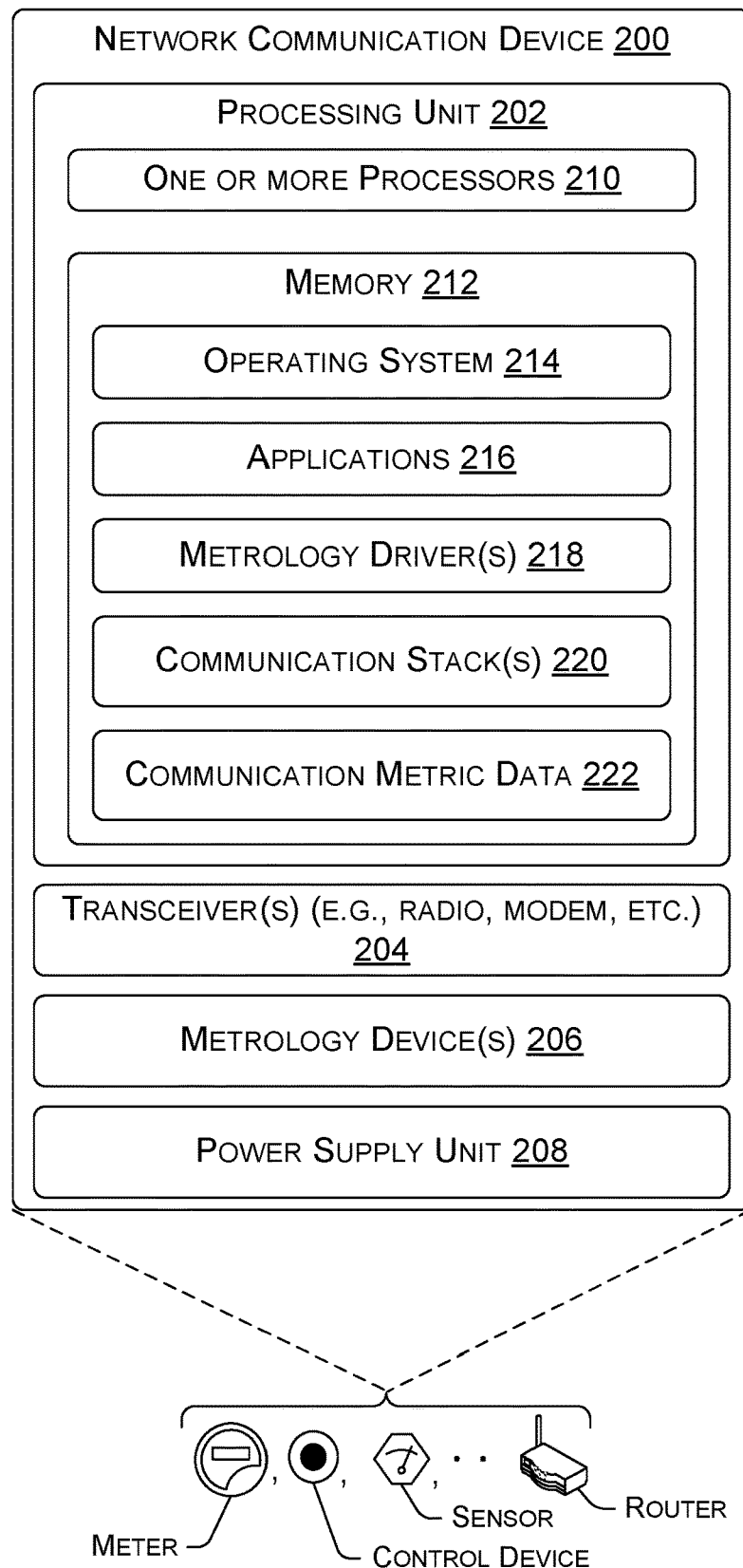
FIG. 2 is a diagram showing details of an example network communication device.

FIG. 2 is a diagram showing details of an example network communication device 200, such as any of the network communication devices 102 or the network communication device 104. The network communication device 200 may comprise any type of network communication device (sometimes referred to as a node, computing device, or just device), such as a router (e.g., a field area router (FAR), a cellular router, an edge router, etc.), a utility meter (e.g., electricity, water, or gas meter), a relay (e.g., a cellular relay), a repeater, a transformer, a sensor, a switch, a control device, an encoder/receiver/transmitters (ERTs), an appliance, a personal computer (e.g., a desktop computer, a laptop computer, etc.), a mobile device (e.g., a smartphone, a tablet, a personal digital assistant (PDA), an electronic reader device, etc.), a wearable computer (e.g., a smart watch, an optical head-mounted display (OHMD), etc.), a server, an access point, a portable navigation device, a portable gaming device, a portable media player, a television, a set-top box, a computer systems in an automobile (e.g., navigation system), a camera, a robot, a hologram system, a security system, a home-based computer system (e.g., an intercom system, a home media system, etc.), a projector, an automated teller machine (ATM), and so on.

In some instances, the network communication device 200 comprises a Full Function Device (FFD), while in other instances the network communication device 200 comprises a Limited Function Device (LFD). An FFD may include more functionality/resources than an LFD, such as different processing powers, processing capabilities, power reliance, hardware components, etc. In one example, an FFD is implemented as a Mains Powered Device (MPD) that is connected to mains electricity (e.g., electricity meters), while an LFD is implemented as Battery Powered Device (BPD) that is not connected to mains electricity (e.g., a water meter, gas meter, etc. that employs batteries). Since an MPD relies on mains power, the MPD may remain in an active state (e.g., a state associated with consuming more than a threshold amount of power). Meanwhile, since a BPD relies on battery power, the BPD may enter a sleep state (e.g., a state associated with consuming less than a threshold amount of power) when the BPD is not communicating or otherwise performing operations. The BPD may use a communication schedule to determine when to enter a sleep state and/or when to enter an active state. This may allow the BPD to conserve battery life. In some instances, components of LFDs are lower power components than the corresponding components of the FFDs.

As shown in FIG. 2, the example network communication device 200 includes a processing unit 202, a transceiver(s) 204 (e.g., radio, modem, etc.), one or more metrology devices 206, and a power supply unit 208. The processing unit 202 may include one or more processors 210 and memory 212. The one or more processors 210 may comprise microprocessors, central processing units, graphics processing units, or other processors usable to execute program instructions to implement the functionality described herein. Additionally, or alternatively, in some examples, some or all of the functions described may be performed in hardware, such as an application specific integrated circuit (ASIC), a gate array, or other hardware-based logic device.

The transceiver(s) 204 may comprise one or more hardware and/or software implemented radios to provide two-way RF communication with other network communication devices in the AN 106 and/or other devices via the network 108. The transceiver(s) 204 may additionally or alternatively include a modem to provide power line communication (PLC) communication with other network communication devices that are connected to an electrical service grid.

In some instances, the transceiver(s) 204 may include different characteristics depending on the type of device implementing the transceiver(s) 204. For example, while both FFDs and LFDs have transceivers, the specific transceivers used may be different. To illustrate, an FFD transceiver may include a PLC modem while an LFD transceiver may not because the LFD is not connected to an electrical power line that could be used for PLC communications. Additionally, or alternatively, an LFD transceiver may employ a lower power RF radio to minimize energy consumption.

The metrology device(s) 206 comprises physical hardware and/or sensors to measure consumption data of a resource (e.g., electricity, water, or gas) at a site of the meter. In the case of an electric meter, for example, the metrology device(s) 206 may include one or more Hall effect sensors, shunts, or the like. In the case of water and gas meters, the metrology device(s) 206 may comprise various flow meters, pressure sensors, or the like. The metrology device(s) 206 may report the consumption data to a service provider via the transceiver(s) 204. The consumption data may be formatted and/or packetized in a manner or protocol for transmission.

The power supply unit 208 may provide power to the network communication device 200. In some instances, such as when the network communication device 200 is implemented as a FFD, the power supply unit 208 comprises a mains power connector that couples to an Alternating Current (AC) or Direct Current (DC) mains power line where the network communication device 200 is installed. In other instances, such as when the network communication device 200 is implemented as a LFD, the power supply unit 208 comprises a battery, such as a Lithium Thionyl Chloride battery (e.g., a 3 volt battery having an internal impedance rated at 130 Ohms), a Lithium Manganese battery (e.g., a 3 volt battery having an internal impedance rated at 15 Ohms), a Lithium Ion battery, a lead-acid battery, an alkaline battery, and so on.

The memory 212 includes an operating system (OS) 214 and one or more applications 216 that are executable by the one or more processors 210. The memory 212 may also include one or more metrology drivers 218 configured to receive, interpret, and/or otherwise process metrology data collected by the metrology device(s) 206. Additionally, or alternatively, one or more of the applications 216 may be configured to receive and/or act on data collected by the metrology device(s) 206.

The memory 212 may also include one or more communication stacks 220. In some examples, the communication stack(s) 220 may be configured to implement a 6LowPAN protocol, an 802.15.4e (TDMA CSM/CA) protocol, an 802.15.4-2015 protocol, 802.15.4g protocol, and/or another protocol. However, in other examples, other protocols may be used, depending on the networks with which the device is intended to be compatible. The communication stack(s) 220 describe the functionality and rules governing how the network communication device 200 interacts with each of the specified types of networks. For instance, the communication stack(s) 220 may cause FFDs and LFDs to operate in ways that minimize the battery consumption of LFDs when they are connected to these types of networks.

As illustrated, the memory 212 may also store communication metric data 222. Communication metric data 222 may be updated from time to time to maintain data for multiple modulation schemes and/or multiple communication links.

In some instances, the network communication device 200 may be configured to send or receive communications on multiple channels simultaneously. For example, the transceiver(s) 204 may be configured to receive data at the same time on hundreds of channels. Additionally, or alternatively, the transceiver(s) 204 may be configured to send data at the same time on hundreds of channels.

The network communication device 200 may be configured to implement a variety of modulation schemes. A modulation scheme may be associated with a modulation type, a data rate, and/or other parameters. In some instances, a same modulation type is used for different modulations schemes to produce different data rates.

Example modulation schemes include: Direct-Sequence Spread Spectrum (DSSS), Quadrature Phase-Shift Keying (QPSK) (e.g., "LONG RANGE" scheme) associated with a data rate of 12.5 kbps; Frequency Shift Keying (FSK) (e.g., "4G_FSK_150" scheme) associated with a data rate of 75 kbps; Orthogonal Frequency-Division Multiplexing (OFDM) (e.g., "4G_OFDM_200" scheme) associated with a data rate of 200 kbps; OFDM (e.g., "4G_OFDM_600" scheme) associated with a data rate of 600 kbps; Differential 8 PSK (DQPSK) associated with a data rate of around 200 kbps; Differential Quadrature PSK (DQPSK) associated with a data rate of around 165 kbps; Differential Binary PSK (DBPSK) associated with a data rate of around 105 kbps; Robust OFDM (ROBO); Narrow Band Frequency Shift Keying modulation associated with a data rate of around 10 kbps (NB_FSK_10) or 24 kbps (NB_FSK_25) or any other modulation scheme. DSSS QPSK (e.g., "LONG RANGE" scheme), FSK (e.g., "4G_FSK_150" scheme), OFDM (e.g., "4G_OFDM_200" scheme, "4G_OFDM_600" scheme or 4G_OFDM_1200" scheme) may correspond to RF modulation schemes. Meanwhile, D8PSK, DQPSK, DBPSK, and ROBO may correspond to PLC modulation schemes. Although any other modulation schemes may be used.

In many instances, the above noted modulation schemes may be ordered according to data rates as follows:
  (i) For RF: 4G_OFDM_1200>4G_OFDM_600>4G_OFDM_200>4G_FSK_150>NB_FSK_25>NB_FSK_10>LONG RANGE;
  (ii) For PLC: D8PSK>DQPSK>DBPSK>ROBO The memory 212 of the network communication device 200 may include software functionality configured as one or more "modules." The modules are intended to represent example divisions of software for purposes of discussion, and they are not intended to represent any type of requirement or required method, manner or necessary organization. Accordingly, while various "modules" are discussed, their functionality and/or similar functionality could be arranged differently (e.g., combined into a fewer number of modules, broken into a larger number of modules, etc.).

The various memories described herein (e.g., the memory 212) are examples of computer-readable media. Computer-readable media may take the form of volatile memory, such as random access memory (RAM) and/or non-volatile memory, such as read only memory (ROM) or flash RAM. Computer-readable media devices include volatile and non-volatile, removable and non-removable media implemented in any method or technology for storage of information such as computer-readable instructions, data structures, program modules, or other data for execution by one or more processors of a computing device. Examples of computer-readable media include, but are not limited to, phase change memory (PRAM), static random-access memory (SRAM), dynamic random-access memory (DRAM), other types of random access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transitory medium that can be used to store information for access by a computing device. As defined herein, computer-readable media does not include transitory media, such as modulated data signals and carrier waves, and/or signals.

While detailed examples of certain network communication devices are described herein, it should be understood that those network communication devices may include other components and/or be arranged differently. As noted above, in some instances a network communication device may include one or more processors and memory storing processor executable instructions to implement the functionalities they are described as performing. Certain network communication devices may additionally or alternatively include one or more hardware components (e.g., application specific integrated circuits, field programmable gate arrays, systems on a chip, and the like) to implement some or all of the functionalities they are described as performing. Further, certain network communication devices may include one or more network interfaces to send or receive data.

Example Processes

Figure 3:
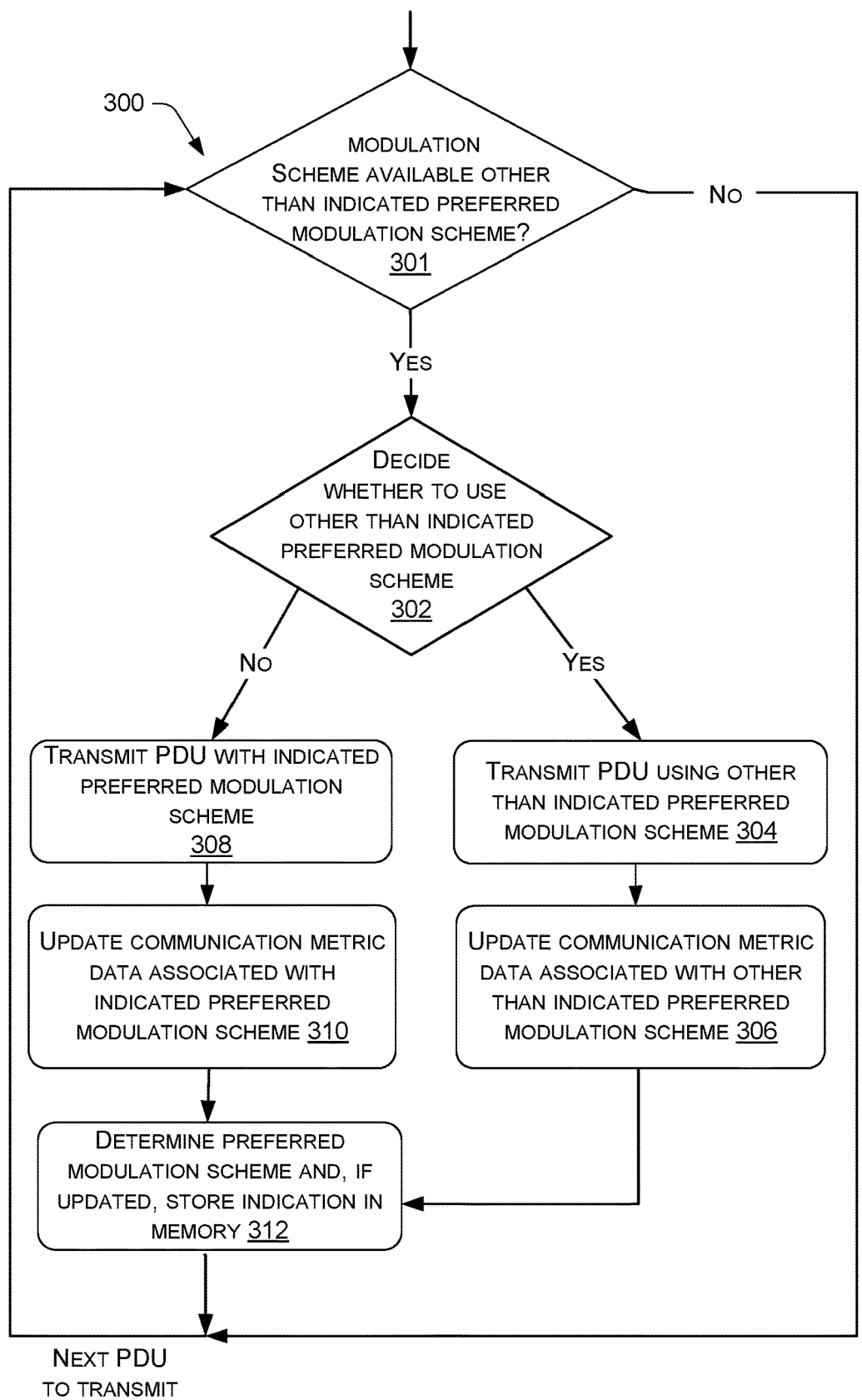
FIG. 3 illustrates an example process to communicate using a modulation scheme that is not indicated as a preferred modulation scheme.
Figure 4:
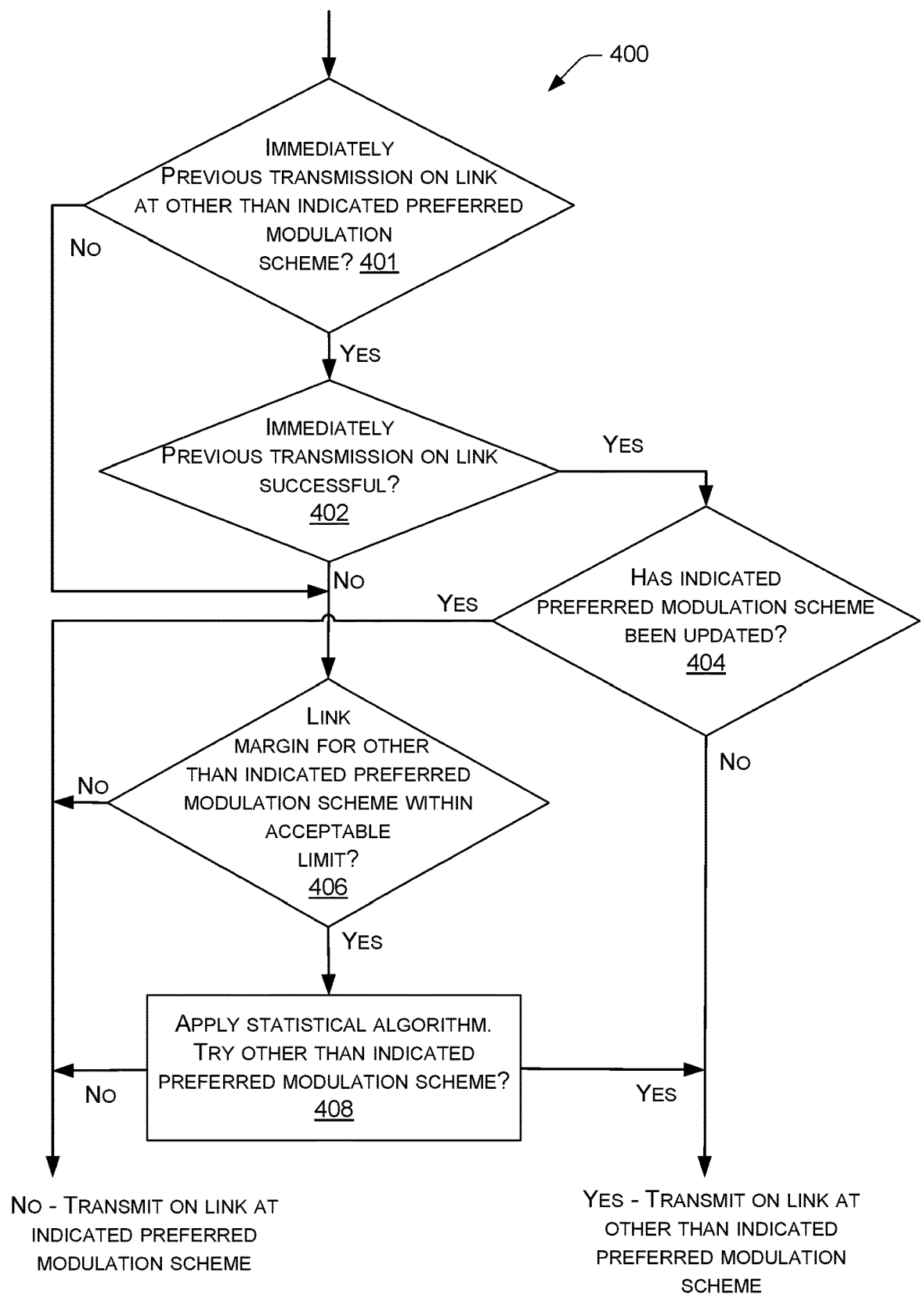
FIG. 4 illustrates an example process to decide whether to use other than an indicated preferred modulation scheme to communicate over a link.

FIGS. 3 and 4, illustrate example processes 300 and 400 for employing the techniques discussed herein. For ease of illustration the processes 300 and 400 may be described as being performed by a device described herein, such as the network communication device 200 and/or the service provider 110. However, the processes 300 and 400 may be performed by other devices. Moreover, the devices may be used to perform other processes.

The processes 300 and 400 (as well as each process described herein) are illustrated as logical flow graphs, each operation of which represents a sequence of operations that can be implemented in hardware, software, or a combination thereof. In the context of software, the operations represent computer-readable instructions stored on one or more computer-readable storage media that, when executed by one or more processors, perform the recited operations. Generally, computer-readable instructions include routines, programs, objects, components, data structures, and the like that perform particular functions or implement particular abstract data types. In some contexts of hardware, the operations may be implemented (e.g., performed) in whole or in part by hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc. The order in which the operations are described is not intended to be construed as a limitation, and any number of the described operations can be combined in any order and/or in parallel to implement the process. Further, any number of the described operations may be omitted.

FIG. 3 illustrates an example process 300 to communicate using a modulation scheme that is not indicated as a preferred modulation scheme, including developing communication metrics for the non-preferred modulation scheme. The non-preferred modulation scheme is typically one that, if successful, provides better performance than the indicated preferred modulation scheme. This may be, for example, a different type of modulation, such as using OFDM instead of FSK. Alternatively, or in addition, this may be, for example, a higher data rate communication.

The network communication device 200 may initiate a link evaluation in a variety of manners, to determine a preferred modulation scheme. In one example, the network communication device 200 performs an "Active Link Evaluation." Here, the network communication device 200 determines that a predetermined period of time has passed since a previous update to communication metric data. This determination may trigger one or more transmissions to be sent by the network communication device 200 to another network communication device, such one or more probe transmissions. If successful, these transmissions are acknowledged by the other network communication device (e.g., the network communication device 200 receives an acknowledgement(s) of the transmissions from the other network communication device). After sending the one or more transmissions (and/or receiving acknowledgements), the communication device 200 may use information it has gathered regarding successful and failed communications to evaluate a link. As such, in the Active Link Evaluation, a link may be evaluated periodically based on actively sending transmissions.

In another example, the network communication device 200 performs a "Passive Link Evaluation." Here, the network communication device 200 maintains normal operations by sending transmissions as they normally occur according to a communication schedule. After determining that a period of time has passed, the network communication device 200 may determine if there have been a predetermined number of transmissions on a link to trigger an evaluation of the link. When the network communication device 200 determines that the predetermined number of transmissions have occurred, the network communication device 200 may proceed to evaluate a link.

In either example, the network communication device 200 may have communicated with another network communication device (e.g., node) one or more times using one or more modulation schemes. As part of evaluating the link, it is determined what modulation scheme is preferred for communication over the link. An indication of the preferred modulation scheme is saved, such as, for example, by storing the indication as part of the communication metric data 222 in the memory 212 of the network communication device 200.

Turning now specifically to the example process 300 illustrated in FIG. 3, at 301, the network communication device 200 determines whether an alternate modulation scheme to the indicated preferred modulation scheme is available. If not, then the process 300 continues with the next PDU to be transmitted. Otherwise, at 302, if there is an alternate modulation scheme available, the network communication device 200 decides whether to use other than the indicated preferred modulation scheme (i.e., a non-preferred modulation scheme) to communicate over a link with another network communication device. If the decision is yes, then at 304, the network communication device 200 transmits a PDU over the link to the other network communication device, using the non-preferred modulation scheme. At 306, the network communication device 200 updates communication metric data associated with the non-preferred modulation scheme. The communication metric data associated with the non-preferred modulation scheme may indicate at least one of a number of successful transmissions with the other network communication device (e.g., a number of acknowledgements received from the other network communication device) and/or a number of unsuccessful transmissions with the second node (e.g., unsuccessful transmissions=number of transmissions sent—number of acknowledgments received). Additionally, or alternatively, the communication metric data may include an Expected Transmission (ETX) metric, an Expected Transmission Time (ETT) metric, and so on. Operation 306 may be based on communications that occurred through either an Active Link Evaluation and/or a Passive Link Evaluation.

At 308, if the network communication device 200 has decided at 302 to not use a non-preferred modulation scheme, the network communication device 200 transmits the PDU using the indicated preferred modulation scheme. At 310, the network communication device 200 updates communication metric data associated with the indicated preferred modulation scheme. Operation 310 may also be based on transmissions that occurred through either an Active Link Evaluation (302) and/or a Passive Link Evaluation (304).

At 312, the network communication device 200 utilizes the communication metric data to determine a preferred modulation scheme and, if updated from the previously indicated preferred modulation scheme, an indication of the updated preferred modulation scheme is stored. Then, for the next PDU to transmit, the decision at 302 is made again.

As discussed above, the operation 302 includes performing a process to decide whether to use other than the indicated preferred modulation to communicate over a link. In some examples, if a previous PDU transmission using a non-preferred modulation scheme was successful, then it is typically decided to use the non-preferred modulation scheme again for the next PDU to be transmitted. The previous successful transmission may become immaterial to the decision, though, if the indicated preferred modulation scheme has been updated since the previous successful transmission. Furthermore, one or more checks may be made in the determination of whether to use a non-preferred modulation scheme. These one or more checks may include at least one of checking for sufficient link margin to for the non-preferred modulation scheme and applying an algorithm such as a statistical algorithm to determine whether to try the non-preferred modulation scheme such that the chance of trying the non-preferred modulation scheme is at least some desired probability. In some examples, the desired probability is based at least in part on a condition of the link.

Turning now to FIG. 4, the process 400 is one example of how the operation 302 may be carried out. At 401, it is determined if there was an immediately previous transmission on the link at other than the indicated preferred modulation scheme. If yes, then at 402, it is determined if the immediately previous transmission on the link was successful. If the immediately previous transmission on the link was determined to be successful, then at 404, it is determined if the indicated preferred modulation scheme for the link has been updated since the immediately previous transmission. If not, then the output of the process 400 is a decision to transmit a PDU at other than the indicated preferred modulation scheme. Otherwise, if the indicted preferred modulation scheme has been updated, then then the output of the process 400 is a decision to transmit a PDU at the indicated preferred modulation scheme.

On the other hand, if it is determined at 401 that there was not an immediately previous transmission on the link at other than the indicated preferred modulation scheme, or if it is determined at 402 that an immediately previous transmission on the link at other than the indicated preferred modulation scheme was not successful, then at 406 it is determined if a link margin for other than the indicated preferred modulation scheme is within an acceptable limit. If not, then the output of the process 400 is a decision to transmit a PDU at the indicated preferred modulation scheme. The use of the link margin as a characteristic of the link to test is just one example. One or more other characteristics of the link may be used as well, instead of or in addition to using the link margin.

If the link margin is determined to be within an acceptable limit, then a statistical algorithm is applied at 408. The result of applying the statistical algorithm determines whether to try other than the indicated preferred modulation scheme. For example, the statistical algorithm may be a pseudorandom number generator that generates a number between zero and one, and a determination that a number is above a certain threshold is a determination to try other than the indicated preferred modulation. For example, it may be desired to try other than the indicated preferred modulation scheme ten percent of the time. In this example, the result of operation 408 is determining to try other than the indicated preferred modulation scheme each iteration that the pseudorandom number generator generates a number between 0 and 0.1.

Figure 5:
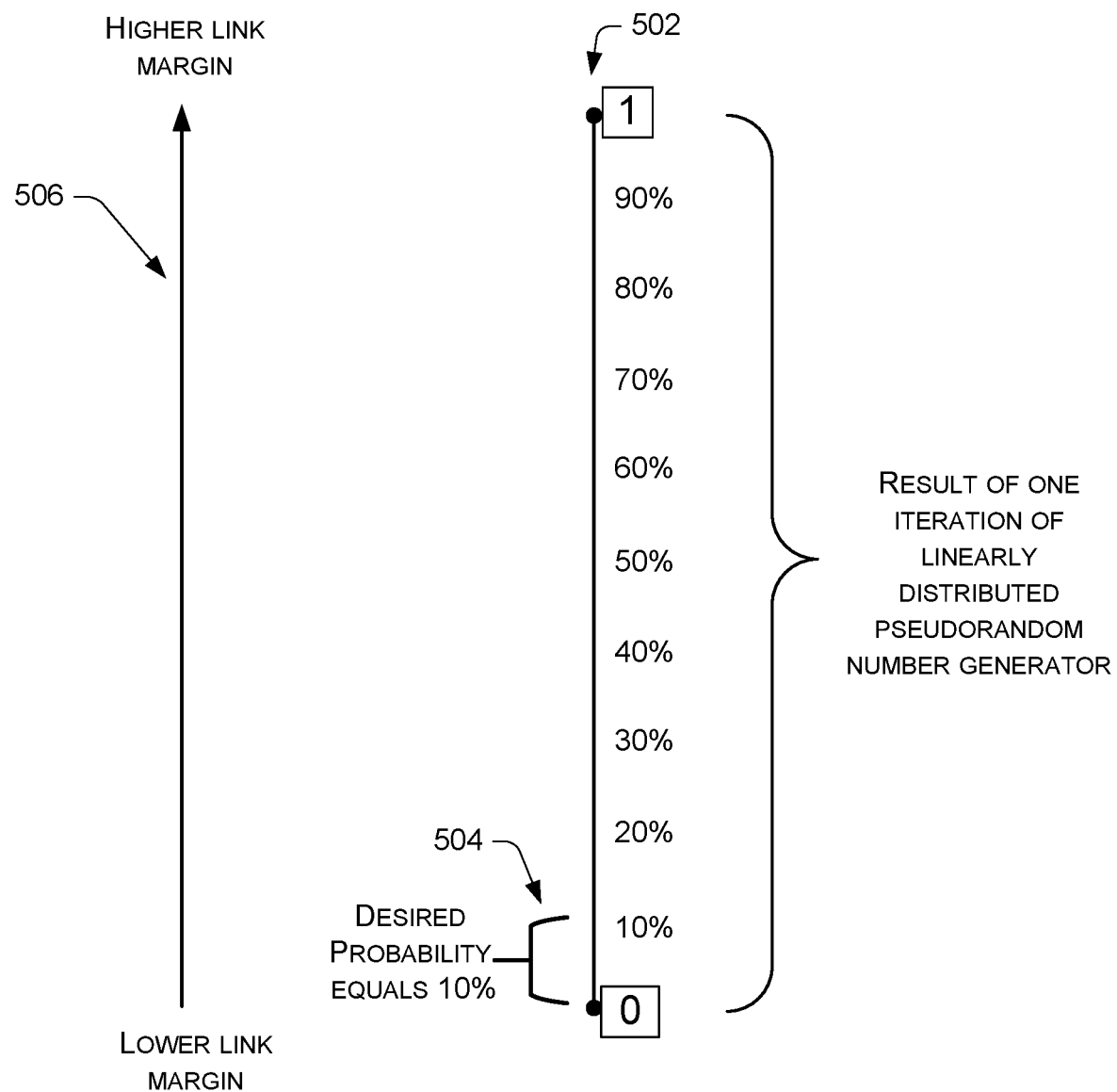
FIG. 5 illustrates an example of applying a statistical algorithm in a process of deciding whether to use other than the indicated preferred modulation scheme.

FIG. 5 illustrates an example of applying the statistical algorithm. In FIG. 5, the line 502 represents a linearly distributed output of a pseudorandom number generator, between 0 and 1. Using the example discussed above, it is desired to try other than the indicated preferred modulation ten percent of the time, and this is indicated by the range 504 of 0 to 0.1 in the output 502 of the pseudorandom number generator.

In some examples, the percentage of time to try is determined based on one or more characteristics of the link. In the FIG. 5 example, the percentage is determined to be higher for higher values of the link margin, as indicated by the arrow 506 in FIG. 5. As indicated in the FIG. 5 example, the higher the value of the link margin as indicated by the arrow 506, the more results of the pseudorandom number generator are encompassed by applying the statistical algorithm in operation 408 of FIG. 4.

The statistical algorithm may, for example, utilize specified minimum and maximum thresholds of percentage of time to try as well as a link margin factor to determine the percentage of time to try within the minimum and maximum threshold. The percentage of time to try is determined by multiplying the link margin in dB by a specified link margin factor.

In one example, the minimum threshold for the percentage of time to try is specified to be 1% and the maximum threshold is specified to be 30%. The link margin factor is specified to be 1% per dB of link margin. Thus, in this example, a link margin of 0 dB would result in the minimum threshold for the percentage of time to try, or 1%; a link margin of 5 dB would result in a percentage of time to try of 5%; a link margin of 25 dB would result in a percentage of time to try of 25%; and a link margin of 40 dB would result in the maximum threshold for the percentage of time to try, or 30%.

Furthermore, the choice of a non-preferred modulation scheme may also depend on the link margin, such as, for example, OFDM being used in place of an indicated preferred FSK when the link margin is greater than 30 dB.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A network communication device, comprising:
one or more processors; and
memory coupled to the one or more processors, the memory storing instructions executable by the one or more processors to perform operations including:
based at least in part on a stored indication of a first transmission characteristic, transmitting a first data item to another network communication device over a link using the first transmission characteristic, wherein the first transmission characteristic is based at least on observed behavior of the link;
based at least in part on a determined availability of a second transmission characteristic for the link that is different from the first transmission characteristic, transmitting a second data item over the link using the second transmission characteristic, wherein transmitting the second data item over the link using the second transmission characteristic is further based at least in part on application of an algorithm;
determining that the transmission of the second data item is successful; and
based at least in part on the transmission of the second data item being successful, transmitting a third data item over the link using the second transmission characteristic.

2. The network communication device of claim 1, wherein the operations further comprise:
determining the first transmission characteristic for the link based at least in part on transmitting of the first data item, transmitting of the second data item, and transmitting of the third data item; and
storing the indication of the first transmission characteristic in the memory.

3. The communication device of claim 1, wherein:
transmitting the second data item over the link using the second transmission characteristic is further based at least in part on at least one characteristic of the link using the second transmission characteristic.

4. The communication device of claim 1, wherein:
the first transmission characteristic is a first modulation scheme; and
the second transmission characteristic is a second modulation scheme, different from the first modulation scheme.

5. The communication device of claim 4, wherein:
the first modulation scheme is characterized by a first modulation type at a first data rate and the second modulation scheme is characterized by the first modulation type at a second data rate that is higher than the first data rate.

6. The communication device of claim 4, wherein:
the first modulation scheme is characterized by a first modulation type and the second modulation scheme different from the first modulation scheme is characterized by a second modulation type.

7. The communication device of claim 1, wherein:
the algorithm is a statistical algorithm.

8. The communication device of claim 7, wherein:
application of the statistical algorithm includes determining whether a chance of transmitting the second data item is within a specified probability.

9. The communication device of claim 8, wherein the specified probability is determined at least in part based on a link margin associated with the link.

10. The communication device of claim 9, wherein the specified probability is bounded to be within a specified maximum threshold and a specified minimum threshold.

11. The communication device of claim 8, wherein:
the statistical algorithm is a pseudorandom number sequence generator and determining whether a result of generating a random number by the pseudorandom number sequence generator is within a range representing the specified probability.

12. The communication device of claim 8, wherein the operations further comprise:
determining the specified probability is based at least in part on at least one characteristic of the link using the second transmission characteristic.

13. A method, comprising:
based at least in part on a stored indication of a first transmission characteristic, transmitting, by a first network communication device, a first data item to a second network communication device over a link using the first transmission characteristic, wherein the first transmission characteristic is based at least on observed behavior of the link;
based at least in part on a determined availability of a second transmission characteristic for the link that is different from the first transmission characteristic, transmitting, by the second network communication device, a second data item over the link using the second transmission characteristic, wherein transmitting the second data item over the link using the second transmission characteristic is further based at least in part on application of an algorithm; and
based at least in part on the transmission of the second data item being successful, transmitting, by the first network communication device, a third data item over the link using the second transmission characteristic.

14. The method of claim 13, further comprising:
determining the first transmission characteristic for the link based at least in part on transmitting of the first data item, transmitting of the second data item and transmitting of the third data item; and
storing the indication of the first transmission characteristic in a memory of the first network communication device.

15. The method of claim 13, wherein:
the first transmission characteristic is a first modulation scheme; and
the second transmission characteristic is a second modulation scheme, different from the first modulation scheme.

16. The method of claim 13, wherein:
the first transmission characteristic is characterized by a first modulation type at a first data rate and the second transmission characteristic is characterized by the first modulation type at a second data rate that is higher than the first data rate.

17. The method of claim 13, wherein:
the algorithm is a statistical algorithm, application of the statistical algorithm including determining whether a chance of transmitting the second data item is within a desired probability.

18. One or more non-transitory computer-readable media storing instructions that, when executed by one or more processors of a node, configure the node to perform operations comprising:
based at least in part on a stored indication of a first transmission characteristic, transmitting, by a first network communication device, a first data item to a second network communication device over a link using the first transmission characteristic, wherein the first transmission characteristic is based at least on observed behavior of the link;
based at least in part on a determined availability of a second transmission characteristic for the link that is different from the first transmission characteristic, transmitting, by the second network communication device, a second data item over the link using the second transmission characteristic, wherein transmitting the second data item over the link using the second transmission characteristic is further based at least in part on application of an algorithm; and
based at least in part on the transmission of the second data item being successful, transmitting, by the first network communication device, a third data item over the link using the second transmission characteristic.

19. The one or more non-transitory computer-readable media of claim 18, wherein:
the algorithm is a statistical algorithm, application of the statistical algorithm including determining whether a chance of transmitting the second data item is within a specified probability.

20. The one or more non-transitory computer-readable media of claim 19, wherein the operations further comprise:
determining the specified probability based at least in part on at least one characteristic of the link using the second transmission characteristic.

* * * * *